May 22, 1928.
E. F. DONNELLY
1,670,764
RELIEF VALVE FOR KITCHEN BOILERS AND THE LIKE
Filed April 1, 1927
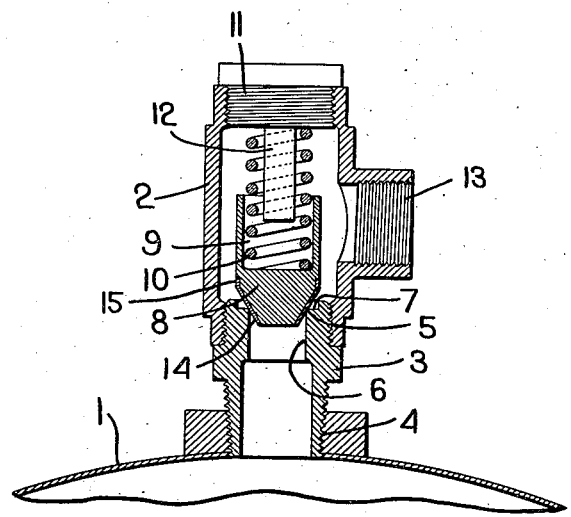
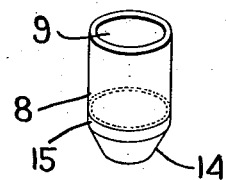
Inventor.
Edward F. Donnelly
by Heard Smith & Tennant.
Attys.

Patented May 22, 1928.

1,670,764

UNITED STATES PATENT OFFICE.

EDWARD F. DONNELLY, OF MALDEN, MASSACHUSETTS.

RELIEF VALVE FOR KITCHEN BOILERS AND THE LIKE.

Application filed April 1, 1927. Serial No. 180,155.

This invention relates to a relief valve such as is used on kitchen boilers and the like and especially to a relief valve of that type which has incorporated therein a fusible member adapted to fuse in case the temperature within the boiler rises above a predetermined point, fusing of the fusible member affording a relief to excessive pressure which accompanies excessive temperature.

One of the objects of my invention is to provide a novel relief valve in which the valve itself is made of fusible metal so that in case the temperature of the boiler rises above a predetermined point the valve will melt thus allowing a relief to the high pressure accompanying the abnormal temperature.

Another object of the invention is to provide a novel relief valve and seat which has a metal-to-metal contact.

The particular features wherein the invention resides will be more fully hereinafter set forth and then pointed out in the appended claims.

In the drawings, Fig. 1 is a sectional view of a relief valve embodying my invention;

Fig. 2 is a perspective view of the valve member.

In the drawings 1 indicates a portion of a container to which a relief valve is applied. This container may be a kitchen boiler or any other similar receptacle.

The relief valve is provided with a body portion 2 to one end of which is screw threaded a combined valve seat and coupling member 3, said member 3 having the exteriorly screw-threaded portion 4 adapted to have a screw-threaded connection with the container 1 and also being provided at its upper end with a valve seat 5. This valve seat is formed by a right angular edge or corner where the walls 6 of the bore through the member 3 meet the flat upper face 7. The valve member is indicated at 8. The lower end of the valve member is frusto-conical in shape and the upper end is cylindrical in shape, said upper end being recessed axially as shown at 9 to provide a seat or socket for the lower end of the spring 10 by which the valve is yieldingly held to its seat. The upper end of the spring 10 engages a cap member 11 which is screw threaded into the upper end of the body 2, said cap member having the guiding pin 12 depending therefrom which extends into the upper end of the spring and forms means for centering the spring and retaining it in its proper position. The recess 9 is relatively deep so that the walls of the recess, which constitute an annular flange, extend well up on the spring. It will be noted that the spring is of a diameter to substantially fill the recess 9 and as a considerable portion of the spring is received in the recess the coaction of the walls of the recess with the spring serves to hold the valve in proper vertical position.

The device operates as a relief valve in the usual manner. The spring 10 normally holds the valve against the valve seat 5, said spring being of sufficient tension or strength to hold the valve seated against the normal pressure in the boiler. If the pressure exceeds the normal pressure then such excessive pressure will lift the valve 8 thereby compressing the spring 10 and the liquid in the boiler may escape through the discharge port 13 into which a discharge pipe may be screwed if desired.

In the present invention the valve 8 is made of fusible metal which has a melting point at a temperature above that corresponding to the normal working pressure in the boiler 1 but below that corresponding to a dangerous pressure or one which is liable to burst the boiler. If the boiler should become overheated and the valve 8 should fail to open to relieve any excessive pressure that might develop in the boiler due to its overheated condition the excessive temperature will fuse or melt the valve 8 thus relieving the pressure in the boiler in the same way as if the valve had opened. Fusible metal is relatively soft and if the portion of the valve which engaged the sharp corner of the valve seat had a surface of this fusible metal there is danger that the pressure of the spring against the valve would embed the sharp corner of the valve seat into the relatively soft metal so that the valve would be liable to stick.

To guard against this I propose to provide the cone surface of my valve with a metal which is harder than the soft fusible metal of the body of the valve and one which while making a tight joint with the right angular valve seat 5 will nevertheless not be cut or indented by the valve seat thus retaining the true fit between these parts. I accomplish this herein by providing a tapering or cone-shaped shell 14 of brass or some similar metal which is fitted over and forms the surface of the cone-shaped portion of the valve. This construction, therefore, provides a fusible valve having a cone-shaped lower end to engage the valve seat which is covered with a jacket or shell of metal harder than the fusible metal of the valve.

The metal-to-metal contact between the valve and the valve seat is highly advantageous because it provides a valve which is very much less liable to stick than a valve in which one of the contacting members is of soft material. In many relief valves either the valve seat or the portion of the valve engaging the seat is of rubber compound or some soft material. In valves of this type the valve is apt to become stuck to the seat after the valve has been closed for a long time. With my improvement, however, in which the valve seat is in the form of a corner and the valve has the conical face so that the contacting portions of the valve and valve seat are in a line only there is very little danger that the valve will stick to its seat and by having the surface of the valve of the harder metal this danger is still further reduced and thus practically eliminated.

In my improved valve the spring 10 is retained in position at its upper end by the pin 12 and at its lower end by the walls of the recess 9. In other words, the spring is retained in position at one end by the cap 11 and at the other end by the valve 8.

I will preferably extend the shell 14 slightly above the base of the conical portion of the valve so that the upper edge 15 of the shell presents a circular portion which embraces and reinforces the valve at this point. This reinforcing portion 15 of the shell serves to prevent the relatively soft metal of the valve from spreading radially near the bottom of the recess due to the pressure of the spring against it.

One advantage of this construction is that if the valve becomes fused by high temperature the valve can only be put again into working position by supplying an entirely new valve since the entire valve is made of fusible metal and will be destroyed by the fusing of the fusible part. This will ensure that whenever the valve is put into commission it will contain a proper valve member.

The valve has the advantage of being an extremely efficient relief valve because of the relative shapes of the valve and valve seat, and has the further advantage that if abnormal temperature develops in the boiler the entire valve will fuse or melt thus relieving the accompanying high pressure.

I claim:

1. In a relief valve for kitchen boilers and the like, the combination with a valve casing having a sharp edge valve seat formed by the junction of two annular surfaces at right angles to each other, of a valve having a conical end which extends partially through the valve seat and which engages the valve seat edge merely with a line contact, said valve being formed of fusible metal, the conical portion of the valve which engages the valve seat being provided with a jacket of metal harder than the fusible metal and which will not be indented by the pressure of the valve against the sharp edge valve seat, a spring for holding the valve yieldingly against its seat, said valve having at its upper end a relatively deep recess to receive the lower end of the spring, said recess being of a size to fit the spring, whereby the spring and the walls of the recess cooperate in maintaining the valve in true alignment.

2. In a relief valve for kitchen boilers and the like, the combination with a valve casing having a cylindrical inlet which terminates at a flat surface and thus presents a right angular valve seat, of a valve having a conical end which seats against the valve seat, there being merely a line contact between the valve and valve seat, said valve being formed of fusible metal, the conical portion of the valve which engages the valve seat being provided with a jacket of metal harder than the fusible metal, said valve having at its upper end a spring-receiving recess, a spring guiding pin depending from the top of the valve body into the recess, and a spring for yieldingly holding the valve to its seat, the lower end of the spring being confined in said recess and fitting the walls thereof and the upper end encircling said pin.

In testimony whereof, I have signed my name to this specification.

EDWARD F. DONNELLY.